United States Patent [19]

Fenn

[11] Patent Number: 4,813,751

[45] Date of Patent: Mar. 21, 1989

[54] SEAT MOUNTED UTILITY CONSOLE

[76] Inventor: Melvin C. Fenn, Rte. 1, Box 2060, Alvaredo, Tex. 76009

[21] Appl. No.: 177,367

[22] Filed: Apr. 4, 1988

[51] Int. Cl.$^4$ ............................................. A47B 83/00
[52] U.S. Cl. ................................. 312/235 A; 297/188
[58] Field of Search ............... 297/188, 250, 254, 194; 312/235 A, 235 R

[56] References Cited

U.S. PATENT DOCUMENTS

| | | | |
|---|---|---|---|
| 2,548,238 | 4/1951 | Potts et al. | 297/250 X |
| 2,563,922 | 8/1951 | Collins . | |
| 2,692,638 | 10/1954 | Castell | 312/235 A |
| 2,934,391 | 4/1960 | Bohnett | 312/293 |
| 3,232,250 | 2/1966 | Hamilton et al. | 108/44 |
| 3,326,446 | 6/1967 | Goings | 312/235 A |
| 3,345,118 | 10/1967 | Cummings | 312/235 |
| 3,579,673 | 5/1971 | Hirschey | 297/250 X |
| 3,632,158 | 1/1972 | Boothe | 296/37 R |
| 3,909,092 | 9/1975 | Kiernan | 312/235 A |
| 3,922,973 | 12/1975 | Sturgeon | 108/26 |
| 4,106,829 | 8/1978 | Dolle et al. | 312/235 A |
| 4,341,418 | 7/1982 | Chappell | 297/192 |
| 4,615,562 | 10/1986 | Ball et al. | 297/250 |
| 4,728,151 | 3/1988 | Neufeld | 297/250 X |

*Primary Examiner*—Francis K. Zugel
*Attorney, Agent, or Firm*—Dennis T. Griggs

[57] ABSTRACT

A vehicle utility console has a rectangular frame defining two separate compartment cavities of relatively different depth. An upstanding flange at the rear end of the frame is adapted to engage a seat back and is secured thereto by a seat belt drawn against the flange. One compartment is relatively shallow and is adapted to ride on the seat. The other compartment of greater depth is contiguous thereto and is located so as to downwardly depend forward of the seat. The entire utility console is of an integral molded composition.

2 Claims, 1 Drawing Sheet

U.S. Patent  Mar. 21, 1989  4,813,751
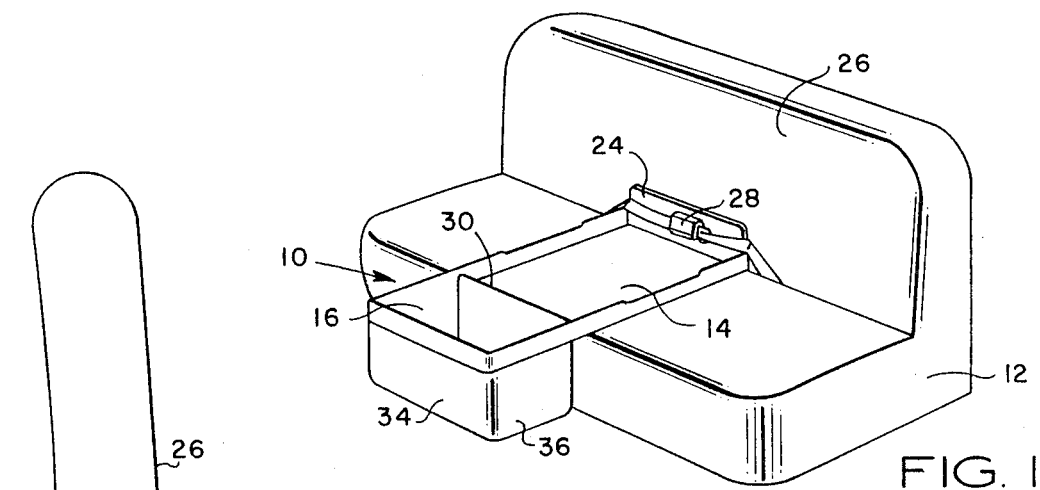
FIG. 1
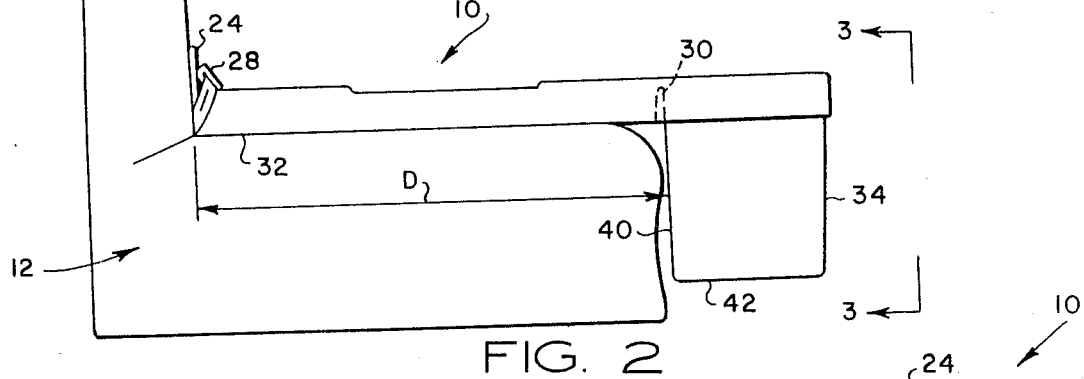
FIG. 2
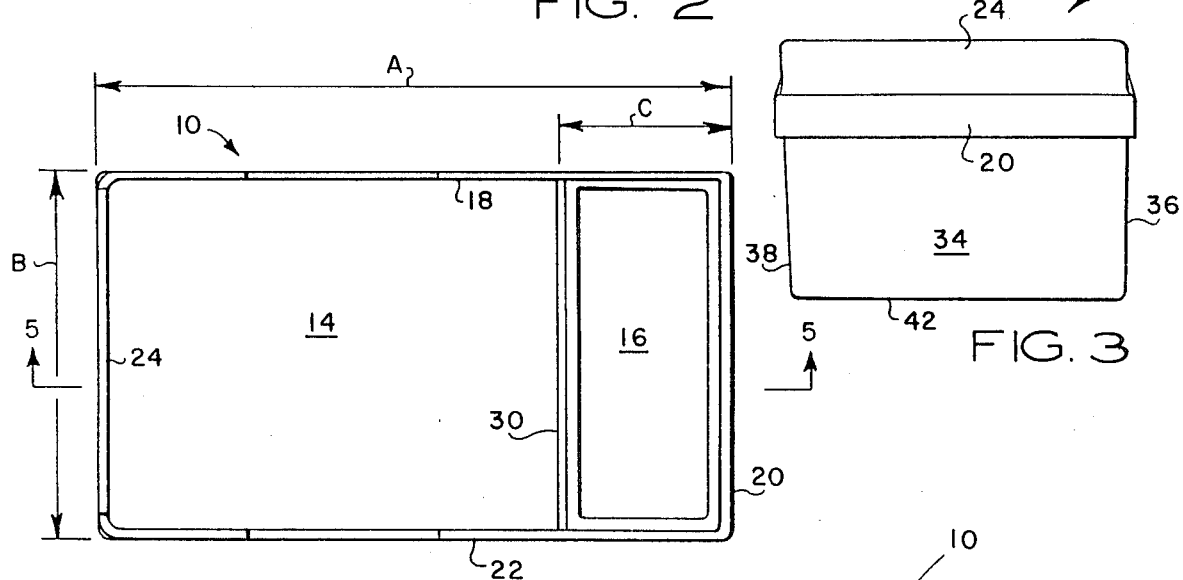
FIG. 3
FIG. 4
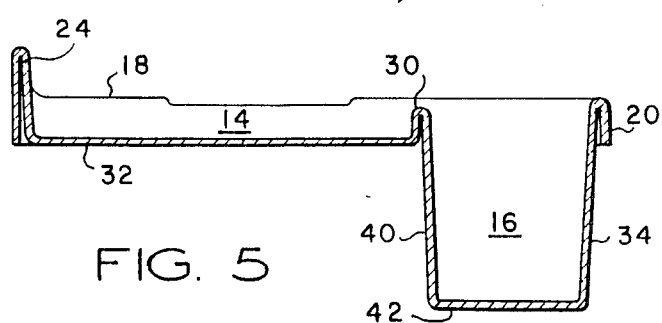
FIG. 5

SEAT MOUNTED UTILITY CONSOLE

FIELD OF THE INVENTION

This invention relates generally to automobile accessories, and in particular to a seat mounted, seat belt restrained utility console.

BACKGROUND OF THE INVENTION

The use of portable consoles in automobiles and trucks is very common and such units are widely available. Portable console units are typically placed either on the floor or seat of a vehicle and come in a variety of different sizes and shapes, depending on the type of articles to be stored. A relatively simple console version mounts over the floor hump overlying the drive shaft and provides separate receptacles for beverage containers, coins, maps, and boxed facial tissues. Other more sophisticated versions are available for use by business travelers to accommodate articles such as briefcases, document files, and the like.

DESCRIPTION OF THE PRIOR ART

Portable consoles for vehicle use are available in a variety of configurations. Smaller units can rest on the floor mat or seat while larger units providing a desk surface usually include an attached tie down to avoid shifting and/or spillage of contents when the vehicle is driven. Exemplifying portable consoles of the latter type are the disclosures of U.S. Pat. Nos. 2,934,391; 3,323,250; 3,345,118; 3,632,158; and 3,922,973.

OBJECTS OF THE INVENTION

It is an object of the invention to provide an improved portable console utility unit for use internally of vehicles.

It is another object of the invention to provide a unique portable utility unit for use internally of vehicles.

A unique object of the invention is to provide a console tray that can easily and quickly be secured onto a vehicle seat by means of an unused seat belt.

It is another object of the invention to provide an improved console tray for vehicle seat placement affording adjacent compartments of different size and depth for containing articles of different sizes.

SUMMARY OF THE INVENTION

This invention relates to portable utility consoles for internal use in vehicles. More specifically, the invention relates to an improved form of a portable console for containing various sized articles and which is designed to be secured in place on the seat of the vehicle by means of an unused seat belt.

The foregoing objects are achieved by the utility console of the preferred embodiment by an integrally molded rectangular frame which includes an upstanding flange for engaging the back surface of the car seat and about which a seat belt can be securely fitted. A relatively shallow tray section is positioned to ride on a seat area while a much deeper tray section rides forward of the seat and downwardly depending toward the floor. The relatively shallow tray is suitable for holding briefcases or other parcels such as maps, letters, packages or other items generally small and flat in size. The deeper and larger cavity by contrast is suitable for holding files and other relatively larger items that are to be organized and secured within the vehicle.

The above noted features and advantages of the invention as well as other superior aspects thereof will be further appreciated by those skilled in the art upon reading the detailed description which follows in conjunction with the drawings

BRIEF DESCRIPTION OF THE DRAWINGS

FIG. 1 is a perspective view of a bench car seat on which a portable utility console has been installed;

FIG. 2 is an enlarged side elevation view of the console and car seat shown in FIG. 1;

FIG. 3 is a front elevation view thereof as seen substantially from the position 3—3 of FIG. 2;

FIG. 4 is an enlarged plan view of the utility console shown in FIG. 1; and,

FIG. 5 a sectional view of the utility console taken along the line 5—5 of FIG. 4.

DESCRIPTION OF THE PREFERRED EMBODIMENT

In the description which follows, like parts are marked throughout the specification and drawings with the same reference numerals, respectively. The drawing figures are not necessarily to scale and the proportions of certain parts have been exaggerated for purposes of clarity.

Referring now to the drawings, the utility console hereof is designated 10 and is illustrated in FIGS. 1 and 2 in a secured relation on an automobile seat 12. The entire console 10 is embodied a rectangular frame formed as an integral unit of a durable water resistant and non-combustible polymer plastic composition.

Comprising the console 10 is a rectangular frame defining two separated compartments 14 and 16 commonly bound about their perimeters by a first side rail 18, a front rail 20 and a second side rail 22. Joining with the foregoing at the rearmost end of the unit, is an upstanding flange 24 adapted to engage the seat back 26 and about which a seat belt 28 can be secured for holding the unit in place on seat 12 as illustrated. Each of the rails as well as flange 24 are of a fold-over construction. For maintaining separation between the two compartments 14, 16 there is provided an upstanding transverse rib 30.

Cavity compartment 14 includes a bottom wall 32 of a width extending between the parallel side rails 18 and 22 and of a length extending between flange 24 and rib 30. The cavity is of relatively large surface area and shallow depth on the order of about 1½-2 inches and is generally suitable to hold briefcases, documents or small flat packages that will be restrained by the surrounding rails. Cavity compartment 16, by contrast, has a smaller bottom surface area but considerably greater depth of about 6-8 inches as defined by front wall 34, sidewalls 36 and 38, rear wall 40 and bottom wall 42. The upper lip of the front and sidewalls include front rail 20 and side rails 18 and 22, respectively. By virtue of its depth, it is more adapted for retaining files and the like that are to be maintained organized in an upright orientation.

The entire console unit 10 is lightweight, preferably less than about five pounds and in the preferred embodiment has an overall length dimension A of approximately 25 inches, and a width dimension B of approximately 14 inches. Length dimension C for cavity 16 is approximately 6 inches while clearance dimension D should be at least slightly greater than the seat dimension and which typically is about 19 inches. By virtue of the rear wall 40 of cavity 16 depending downwardly beyond and almost engaging the face of the car seat, any weight contained in cavity 16 will tend to promote a turning moment about seat belt 28 so as to engage the seat face and aid in maintaining the secured relation of the utility console 10.

By the above description, there is disclosed an improved portable utility console for internal use within a vehicle. Being that the utility console 10 provides divided compartments of different surface area and different depth, a variety of different shaped articles can be conveniently placed therein and organized during operation of the vehicle. Unlike previous consoles, the console hereof is not dimensionally limited to the seat length but instead extends beyond the seat length with an overhang defining a second cavity. This provides a much deeper container tray in combination with a relatively shallow container tray riding over the seat.

While the overhang structure of the larger cavity in itself provides a certain amount of stability to the utility console 10 in the back-to-front direction of the vehicle, the seat belt attachment restrains the console to avoid dumping or spillage of its contents.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A vehicle utility console comprising, in combination:

a rectangular shaped frame having a first set of sidewalls defining a rear compartment cavity of shallow depth and having a second set of sidewalls defining a forward compartment cavity of relatively greater depth than the depth of said rear compartment cavity;

said frame having an L-shaped side profile in which the forward compartment cavity forms the foot thereof;

each of said compartment cavities having bottom walls merging with said first and second sets of sidewalls, respectively;

the bottom wall defining said rear compartment cavity being adapted to ride on the seat of a vehicle and the sidewalls defining said forward compartment cavity being adapted to depend downwardly beyond the forward edge of a vehicle seat;

an upstanding flange formed on a rear compartment portion of said frame and about which a seatbelt can be secured for anchoring the rear compartment of the console onto a seat of a vehicle; and, said forward compartment cavity being disposed at the distal end of said frame whereby the weight of articles within said forward compartment cavity tends to produce a rotational moment of the frame about said flange, with the rotational moment being reacted through a seatbelt secured about said flange when said console is installed onto a vehicle seat.

2. A vehicle console as defined in claim 1, in which said first and second cavities are separated by an upstanding divider wall transversely extending therebetween.

* * * * *